United States Patent [19]

Kohl et al.

[11] Patent Number: 4,472,455

[45] Date of Patent: Sep. 18, 1984

[54] PRODUCTION OF MAGNETIC RECORDING MEDIA

[75] Inventors: Albert Kohl, Weisenheim; Werner Balz, Limburgerhof; Milena Melzer, Ludwigshafen; Norbert Schneider, Altrip; Eberhard Koester, Frankenthal; August Lehner, Roedersheim-Gronau, all of Fed. Rep. of Germany

[73] Assignee: BASF Aktiengesellschaft, Fed. Rep. of Germany

[21] Appl. No.: 565,221

[22] Filed: Dec. 23, 1983

[30] Foreign Application Priority Data

Dec. 28, 1982 [DE]  Fed. Rep. of Germany ....... 3248327

[51] Int. Cl.$^3$ ............................................. H01F 10/02
[52] U.S. Cl. ...................................... 427/48; 427/128; 427/130
[58] Field of Search .......................... 427/48, 128, 131; 428/900, 624

[56] References Cited

U.S. PATENT DOCUMENTS

| | | | |
|---|---|---|---|
| 2,871,218 | 1/1959 | Schollenberger | 260/45.4 |
| 4,310,565 | 1/1982 | Lehner et al. | 427/48 |
| 4,320,171 | 3/1982 | Motz et al. | 428/423.1 |
| 4,328,282 | 5/1982 | Lehner et al. | 428/425.9 |

Primary Examiner—Bernard D. Pianalto
Attorney, Agent, or Firm—Keil & Weinkauf

[57] ABSTRACT

Magnetic recording media are produced by dispersing finely divided anisotropic magnetic material and conventional additives in a solution of a polymeric binder in an organic solvent, or in an aqueous dispersion of a polymeric binder, adding a polymer based on hydrophilic ethylenically unsaturated compounds to the magnetic dispersion, applying a layer of the dispersion to a non-magnetizable base, orienting the anisotropic magnetic material in a magentic field and drying the applied layer.

8 Claims, No Drawings

PRODUCTION OF MAGNETIC RECORDING MEDIA

The present invention relates to a process for the production of magnetic recording media which are particularly useful as audio, video or computer tapes, by preparing a dispersion of finely divided anisotropic magnetic material and conventional additives in a solution of a polymeric binder in an organic solvent, or in an aqueous dispersion of a polymeric binder, applying a layer of the dispersion to a non-magnetizable base, orienting the anisotropic magnetic material in a magnetic field and then drying the applied layer.

The magnetic layers of recording media used in modern audio and video recording and playback apparatuses have to satisfy a number of different requirements. In addition to the high demands made on their electroacoustic properties, the magnetic layers are required to exhibit outstanding mechanical properties, particularly where audio tapes, video tapes and computer tapes are concerned; there is a continual demand by tape transport manufacturers for an improvement of these properties to suit new equipment. The magnetic layers must be very flexible and highly elastic and have a high tensile strength. Furthermore, in order to avoid drops in output level, it is becoming increasingly necessary to reduce the coefficient of friction, increase the resistance to abrasion and to wear, and improve the stability in tropical climates. Moreover, improvement of the electroacoustic properties necessitates increasingly smoother magnetic coatings, with the result that soft thermoplastic magnetic layers tend to stick together at temperatures as low as 20° to 30° C. and tend to do so to a greater extent at higher temperatures and high atmospheric humidity. This results in blocking of the tapes, which then become useless. These difficulties can be partially overcome by the use of a somewhat rougher magnetic layer, but this is achieved only at the expense of the electroacoustic properties.

In order to avoid these drawbacks, it is necessary not only to use a particularly suitable magnetic pigment, eg. chromium dioxide, cobalt-doped iron oxide and ferromagnetic metal particles, but also to match all the materials present in the magnetic layer so that this layer has particularly high remanence in the recording direction, and a very smooth surface. Such magnetic layers must contain a large amount of magnetizable material, and these acicular magnetizable particles must be capable of being oriented in the magnetic layer, so that they lie to a very substantial extent parallel to the envisaged recording direction. For a given magnetic material, it is precisely the improvement of the said properties, eg. surface roughness, remanence and orientation ratio, coupled with the achievement of excellent mechanical properties that depends to a large extent on the binders and additives used for producing the magnetic layer. Of the additives, lubricants, water repellents and dispersants are the ones which chiefly affect the electroacoustic, magnetic and mechanical properties of the tapes.

Reduction of the surface roughness of the magnetic layer is particularly important in the case of high-quality magnetic recording media, since particularly close tape/head contact is required for the resolution of very short wavelengths. The tapes must therefore be highly resistant to wear, since damage to the layer immediately results in drops in output level.

To solve these problems, a very large number of different routes have been investigated to date, for example:

(a) The addition of water repellents during the preparation of the magnetic dispersion, or subsequent application thereof to the magnetic layer.

(b) The use of very special lubricants. Preferred lubricants are those which are non-hydrophilic and do not tend to stick under the action of water.

(c) Inreasing the surface hardness, for example by crosslinking with a polyisocyanate or by radiation curing. Systems which are particularly frequently described and in use are those based on polyurethanes and/or mixtures of these with relatively hard polymers, which, when reacted with polyisocyanates, give relatively hard layers which are said to be less thermoplastic and more stable mechanically.

The large number of measures proposed hitherto frequently have substantial deficiencies in respect to process technology or production, or they do not adequately meet the requirements set, or meet only some of them. For example, water repellents and lubricants are often applied subsequently in an additional operation. If these agents are present in the magnetic layer, they frequently act as plasticizers and have an adverse effect on the adhesion of the layer to the base. These disadvantages then have to be overcome by additional measures. However, increasing the resistance to wear by means of crosslinking with a polyisocyanate, which is attended by a reduction in the thermal stability, can be carried out only in the case of certain binder systems and solvent systems. Moreover, crosslinking of this type involves all the uncertainties associated with a 2-component polyurethane reaction, for example an increase in viscosity with storage time, the water content of the pigment solvent used in the magnetic dispersion, the degree of relative humidity, and the basicity or acidity of the starting materials, metal salts, etc.

Owing to the high drying temperature and calendering temperature, very high winding pressures can occur in some cases in the roll of web material or pancake, with the result that adjacent convolutions sometimes stick together. This is particularly critical where an improvement in the mechanical strength is achieved only by crosslinking with a polyisocyanate and the reaction has not progressed sufficiently. When crosslinking is effected with a polyisocyanate, the quality of the starting materials must meet very high standards, and care must be taken to precisely maintain the reaction parameters, in order to obtain reproducible tape characteristics. Hence, particularly in the production of magnetic tapes, it is advantageous if crosslinking with a polyisocyanate can be partly or completely dispensed with, or if the same, readily reproducible tape characteristics can be achieved with a different additive.

Accordingly, in the case of conventional binder systems, the aim was always to eliminate disadvantages and deficiencies, for example excessively high thermoplasticity, escessively low stability in tropical climates, excessively low abrasion resistance, premature drops in output level as a result of poor durability, etc., by individual measures or by a combination of a number of measures or process steps, or to reduce the effects of these disadvantages and deficiencies. The solutions proposed hitherto have not proved good enough for achieving optimum results, particularly when different binder systems are used.

It is an object of the present invention to provide a process for the production of magnetic recording media which, as a result of the use of a special additive, are more resistant to wear, harder and more stable in tropical climates, and at the same time are less thermoplastic and have a lower coefficient of friction, while exhibiting unchanged magnetic and electroacoustic properties; the said additive makes it possible for other process steps, for example the addition of a polyisocyanate or radiation curing, to be partly or completely dispensed with, or makes these steps more reliable. As a result of these improvements, drops in output level are avoided, and blocking of the tapes under extreme conditions is prevented.

We have found that this object is achieved, and that, surprisingly, magnetic recording media having the required properties are obtained, if a polymer comprising
(A) from 25 to 80% by weight of a polyether acrylate of the formula

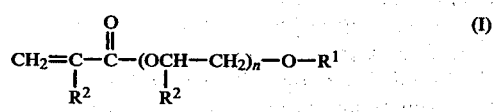

or

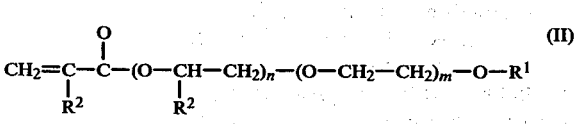

or a mixture of (I) and (II), where $R^1$ is hydrogen, alkyl of 1 to 25 carbon atoms or $C_1$-$C_{12}$-alkyl-substituted phenyl, $R^2$ is hydrogen or $CH_3$, n is 1 to 30 and m is 0 to 25,
(B) from 75 to 20% by weight of an ethylenically unsaturated $C_3$-$C_{10}$-carboxylic acid, or a mixture of such acids, and
(C) from 0 to 40% by weight of an acrylate of the formula

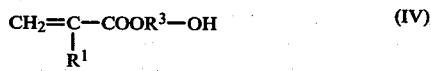

or

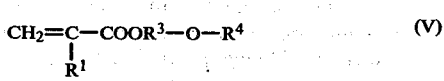

where $R^3$ is alkyl of 1 to 20 carbon atoms, $R^4$ is identical to $R^3$ or is

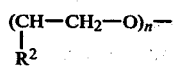

where n is 1 to 20,
and $R^1$ and $R^2$ have the above meanings, is added to the dispersion used to produce the magnetic layer.

Depending on the binder, the magnetic material and the other additives, it has proven advantageous to use the polymer in the form of the salt. Counter-ions of ammonia or amines having a boiling point below 100° C. have proven particularly advantageous. These copolymers are prepared in a conventional manner, for example by means of free-radical or redox polymerization in solution.

The improvements which can be achieved using the novel process could not be foreseen since the polymer added consists predominantly or completely of very hydrophilic groups and furthermore gives films of poor mechanical strength. Owing to their structure, these polymers are very hydrophilic, if not water-soluble. In general, it is known that polymers which contain a large number of acidic or ether groups are good wetting agents and dispersants, but that the use of these polymers had a very adverse effect on the resistance of the end product to water, ie. its stability in tropical climates decreases, friction increases and it has a greater tendency to block. Hence, it was not be expected that the addition of such a polymer would result in an improvement in the tape properties in the case of very different binders and very different magnetic materials, and even in aqueous systems. The dispersing action is not important, as is evident in the case of systems in which the polymers interfere with the dispersing operation rather than promoting it.

The polymers for improving the magnetic coating's resistance to wear and its stability in tropical climates are added in an amount of from 2 to 20, preferably from 3 to 15, % by weight, based on the binder. To improve the said properties, the addition can take place either before or after the dispersing operation, preferably beforehand. Consequently, the dispersing action of the novel additive can be utilized, and good, uniform distribution of the magnetic pigment in the mix can be achieved. If the magnetic layer is produced using other conventional additives which, in addition to having other effects, such as improving the frictional properties and flow, also promote dispersion, the novel polymer still exhibits its advantageous action.

The preparation of the dispersion of the magnetic material in the dissolved or dispersed polymeric binder is effected in a conventional manner.

Suitable binders for the dispersion of the finely divided magnetic material are those conventionally used for the production of magnetic layers, for example a nylon copolymer which is soluble in conventional solvents, a polyvinylformal, a polyurethane elastomer, mixtures of polyisocyanates and relatively high molecular weight polyhydroxy compounds or vinyl chloride polymers containing more than 60% of vinyl chloride units, eg. a vinyl chloride copolymer containing one or more comonomers, eg. a vinyl ester of a monocarboxylic acid of 2 to 9 carbon atoms, or an ester of an aliphatic alcohol of 1 to 9 carbon atoms with an ethylenically unsaturated carboxylic acid of 3 to 5 carbon atoms, eg. esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl- or 2-hydroxyethyl acrylate or methacrylate.

Magnetic dispersions which are particularly useful for the production of rigid magnetic recording discs preferably contain, as binders, for example epoxy resins, phenoxy resins, aminoplast precondensates, polyester resins, polyurethanes or substances which produce polyurethanes, as well as mixtures of such binders with one another and with other binders, such as polycarbonates or vinyl polymers, eg. vinyl chloride copolymers, vinylidene chloride copolymers or thermosetting acrylate or methacrylate copolymers.

The addition of the polymers according to the novel process is particularly advantageous in the binder systems below.

1. Aqueous or solvent-containing polyurethane ionomers, preferably anionic polyurethane ionomers, for example those described in German Laid-Open Applications DOS No. 2,920,334 and DOS No. 3,005,009.

2. Solvent-containing polyurethane elastomers as described in, for example, German Published Applications DAS No. 1,106,959 and DAS No. 2,753,694. The polyurethanes can be used as individual binders or, preferably, as a mixture with other polymers (eg. polyvinylformal, phenoxy resin or vinyl chloride copolymers). Preferably, from 10 to 40% of the second binder component is added. It is a particular advantage of these binders that additional dispersants can be completely or partly dispensed with. Whereas additives are generally used in the smallest possible amounts, because they would otherwise have an adverse effect, this is not to be feared in the case of the polymers used in the novel process; on the contrary, adding a largish amount improves the properties. Consequently, crosslinking with a polyisocyanate which, depending on the type of tape and on the binder system, may otherwise be required can be completely or partly dispensed with.

3. Solvent-containing polyurethane polymers of the polyol/polyisocyanate type. Preferred polymers are those described in German Laid-Open Applications DOS Nos. 3,227,161, 3,227,163 and 3,227,164. It is a particular advantage of these polymers that the mechanical properties of the magnetic layer are not determined solely by the polyisocyanate, so that system-related reaction differences or errors can only manifest themselves to a certain extent or are completely suppressed.

Crosslinking of the magnetic coating, which, depending on the binder system and the spectrum of tape properties, may be required, is achieved by the reaction of the polyurethanes or polyurethane binder mixtures with polyisocyanates. A large number of organic diisocyanates, triisocyanates or polyisocyanates or isocyanate prepolymers having a molecular weight of up to 10,000, preferably from 500 to 3,000, can be used for the crosslinking. Polyisocyanates possessing more than 2 NCO groups per molecule are preferred. Polyisocyanates which are based on toluylene diisocyanate, hexamethylene diisocyanate or isophorone diisocyanate and are formed by a polyaddition reaction with a diol or triol or by biuret or isocyanurate formation have proven particularly useful. An adduct of toluylene diisocyanate with trimethylolpropane and diethylene glycol is particularly advantageous. The amount of polyisocyanate used can vary greatly, depending on the binder system.

Preferred solvents are water, cyclic ethers, eg. tetrahydrofuran and dioxane, and cyclic ketones, eg. cyclohexanone. Depending on the field of application, the polyurethanes can of course also be dissolved in another strongly polar solvent, eg. dimethylformamide, N-methylpyrrolidone, dimethyl sulfoxide or ethylglycol acetate. The said solvents may also be mixed with aromatics, eg. toluene or xylene and esters, eg. ethyl or butyl acetate.

Preferred magnetic materials are finely divided acicular gamma-iron(III) oxide and acicular chromium dioxide, each having a mean particle size of from 0.1 to 2, in particular from 0.1 to 0,9, μm. Other suitable materials are gamma-iron(III) oxide doped with heavy metals, in particular cobalt, as well as finely divided alloys of iron, cobalt and/or nickel.

Other additives for improving the magnetic layer may also be added to the dispersions. Examples of such additives are fatty acids, polycarboxylic acids, mono-, di- and polysulfonic acids and phosphoric acids and their mixtures, esters and salts with metals of groups one to four of the periodic table, as well as waxes, lecithins, silicone oils, fluorocarbons, and fillers, such as carbon black, graphite, quartz powder and/or non-magnetizable silicate-based powders. In general, the total amount of such additives is less than 10% by weight, based on the magnetic layer.

The magnetic layers are produced in a conventional manner: the magnetic material, together with the binder used and sufficient solvent, is dispersed in a dispersing apparatus, e.g. a tubular ball mill or a stirred ball mill, with the addition of copolymers and with or without the addition of other additives. To obtain an advantageous binder/pigment ratio, the binder can be added to the mixture either in solid form or as a 10–60% strength solution or a 20–60% dispersion. It has proved advantageous to continue dispersion until the magnetic material is extremely finely dispersed; this may take from 1 to 5 days. Subsequent repeated filtering gives a completely homogeneous magnetic dispersion. Any crosslinking agents which may be required are added to the dispersion before the coating operation.

The magnetic dispersion is applied to the non-magnetizable base by means of a conventional coating apparatus, e.g. a knife coater. Suitable non-magnetizable bases are the conventional base materials, in particular films of linear polyesters, such as polyethylene terephthalate, which are in general from 4 to 200 and in particular from 6 to 36 μm thick. Before the still fluid coating mix is dried on the base, a procedure which is advantageously carried out at from 50° to 90° C. for from 2 to 5 minutes, the anisotropic magnetic particles are oriented in the intended recording direction by the action of a magnetic field. Thereafter, the magnetic layers can be subjected to a conventional surface treatment, e.g. calendering, in which the coated base is passed between polished rollers, with the application of pressure and optional heating at from 40° to 100° C., preferably from 60° to 80° C. The magnetic layer is in general from 3 to 20, preferably from 4 to 15, μm thick.

The recording media produced according to the invention exhibit improved resistance to wear and stability in tropical climates, increased surface hardness and reduced thermoplasticity, and have lower coefficients of friction. Drops in output level are avoided, and blocking of the tapes is prevented.

The Examples which follow illustrate the novel process without restricting it in any way, and its advantages over the art are illustrated by means of comparative experiments.

Polymer A 40 parts of methacrylic acid,
60 parts of $CH_2=CH-CO-(O-CH_2-CH_2-)_n-O-CH_3$ where $n=8$ to 14 (the monomer is a mixture of compounds where $n=8$ to 14, compounds where $n=10$ to 12 predominating), 180 parts of isopropanol and
120 parts of water
were introduced into a stirred vessel equipped with a thermometer, a reflux condenser, an inlet for nitrogen and a heating jacket.

The mixture was heated to 50° C., while stirring, 3.2 parts of azoisobutyronitrile were added and the mixture was then heated at the boil. After 3 hours, the mixture was cooled, the polymerization being complete. The clear yellowish polymer solution had a solids content of 25% and the polymer had a K value of 42.1. The K value was determined in accordance with Fikentscher, Cellulosechemie 13 (1932), 58–65 and 71–74, on a 3% strength solution in dimethylformamide; $K = k \cdot 10^3$.

Polymer B

The apparatus used was similar to that described in Example A, except that it was pressure-tight.

Feed I 34 parts of methacrylic acid,
66 parts of $CH_2=CH-CO-(O-CH_2-CH_2-)_n-O-CH_3$, where n = 8 to 14 and
250 parts of tetrahydrofuran.

Feed II 50 parts of tetrahydrofuran and
3.2 parts of azoisobutyronitrile.

The reaction vessel was flushed with $N_2$, after which 70 parts of feed I were introduced and heated to 50° C. At this temperature, 20% of feed II was added, and the mixture was heated to 80° C. 15 minutes after the mixture had reached 80° C., feeds I and II were introduced uniformly in the course of 75 minutes, and stirring was then continued for a further 90 minutes at 80° C. After cooling, the resulting polymer solution had a solids content of 25.8% by weight, and the polymer had a K value of 18.4, determined on a 3% strength solution in dimethylformamide.

Polymer C

The apparatus and procedure were the same as described in Example B, except that the feeds had the following compositions:

Feed I 31 parts of methacrylic acid,
58 parts of $CH_2=CH-CO-(O-CH_2-CH_2-)_n-O-CH_3$, where n = 8 to 14 and
6 parts of $CH_2=CH-CO-(O-CH_2-CH-)_2-O-(CH_2)_3-CH_3$, where n = 8 to 14,
5 parts of $CH_2=CH-CO-O-(CH_2)_4-OH$ and
250 parts of tetrahydrofuran.

Feed II 50 parts of tetrahydrofuran and
3.2 parts of azoisobutyronitrile.

The resulting polymer solution had a solids content of 25.6% by weight and the polymer had a K value of 19.1, determined on a 3% strength solution in dimethylformamide.

EXAMPLE 1

1,200 g of a magnetic iron oxide having a coercive force of 26 kA/m and a specific surface area of 20 m²/g, 120 g of the additive described under polymer A, 24 g of 10% strength ammonia solution, 30 g of a 20% strength solution of a sodium polyphosphate and 84 g of a lubricant, composed of zinc stearate, and organopolysiloxane and triethanolamine dioleate in a ratio of 5:10:2.5, were introduced into a steel ball mill having a capacity of 6,000 parts by volume and containing 8,000 g of balls 4–6 mm in diameter, and the mixture was dispersed with 760 g of water for 20 hours. 750 g of a 40% strength polyurethane ionomer dispersion based on a hydroxyl-containing polyester, 4,4'-diphenylmethane diisocyanate, butane-1,4-diol, Epikote ®-diacrylate, mercaptoacetic acid and triethylamine were then incorporated into this mixture.

®=Registered Trademark of Deutsche Shell AG

The resulting magnetic dispersion was filtered and then applied to a 12 μm thick polyethylene terephthalate film, using a knife coater.

Before being dried at 70°–90° C., the coated film was passed through a uniform magnetic field to orient the magnetic particles in the layer, after which the layer was calendered at 70° C. The dry layer was 4.7 μm thick. The resulting film was slit into 3.81 mm wide tapes.

The electroacoustic properties conformed to the IEC I standard. The results obtained in the following tests are given in Table 1.

Test 1

Coefficient of friction, magnetic layer/steel, before and after sustained operation The coefficients of friction were determined, in accordance with DIN No. 45,522, Sheet 1, on the virgin tape and on the tape after it had been in use for a prolonged period.

Test 2

Friction at very low relative velocity

The coefficient of friction was determined by measuring the tensile force produced by the friction between a moving magnetic tape and a stationary drum. The drum was a steel drum having a surface roughness of about 0.15 μm and a diameter of 70 mm. The piece of tape was 25 cm long and was drawn, under a tension of 20 cN, over the drum at a velocity of 1 mm/sec, the wrap-around angle being 180°. The tensile force exerted on the drum, F, is a measure of the coefficient of friction μ, where $\mu = (1/\pi) \times \ln (F/20)$.

Test 3

Deposits 4 cassettes loaded with the magnetic tape were operated on a recorder in the playback mode for 20 hours at 40° C. and 55% relative humidity. The deposits formed on the erasing head, on the recording/playback head and on the capstan was then assessed visually. The thickness of the deposits was assessed according to a rating system of 1 to 6 (1 denoting no deposits, and 6 very thick deposits), and the mean value was calculated.

Test 4

Deposits under tropical climatic conditions 10 cassettes loaded with the magnetic tape were stored for 4 weeks at 40° C. and 93% relative humidity and then operated on a recorder in the playback mode at 30° C. and 93% relative humidity. The deposits were assessed as in Test 3.

Test 5

Suitability for duplication

Groups of 10 cassettes were stored and operated under the same conditions of temperature and humidity as in Test 4. Thereafter, each cassette was subjected to one pass at 8 times the normal speed (38 cm/sec). The percentage of cassettes which exhibited disturbances in the running of the tape or blocking is given.

Test 6

Wear in sustained operation

This test is used to assess the wear properties of a tape, the abrasion being measured in the form of the loss of weight, in mg, of a tape loop 95 cm in length. The tape was run at a speed of 4 m/sec under a tension of 35 cN for 1 hour at an ambient temperature of 23° C. and 50% relative atmospheric humidity.

Test 7

Blocking (layer-to-layer adhesion)

Blocking of the magnetic tapes was measured in accordance with the MIL-T-21029A method, which differentiates between blocking and delamination of the magnetic coating and base.

Test 8

Resistance to water

To determine the resistance to water, a piece of fine white felt measuring 2×2 cm and impregnated with water was drawn ten times over a piece of magnetic tape 30 cm in length, using a pressure of 100 p/cm². The extent of the deposits on the felt and the abrasion of the magnetic layer were assessed according to a rating system of 1 to 6 (1 denoting no deposits on the felt and 6 complete delamination of the magnetic layer from the base).

Test 9

Drop in output level

The number of runs until a drop in the output level of more than 2 dB occurred was determined.

COMPARATIVE EXPERIMENT A

The procedure described in Example 1 was followed, except that a 25% strength solution of an ammonium polyacrylate was used instead of polymer A, and dispersion was carried out for 48 hours. The results are shown in Table 1.

COMPARATIVE EXPERIMENT B

The procedure described in Example 1 was followed, except that a 25% strength aqueous solution of a polymer containing

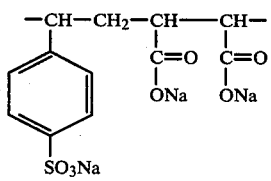

was used instead of polymer A, and dispersion was carried out for 48 hours. The results are shown in Table 1.

TABLE 1

|  | Example | Comparative Experiment A | Comparative Experiment B |
|---|---|---|---|
| Layer thickness [μm] | 5.1 | 5.4 | 5.5 |

TABLE 1-continued

|  | Example | Comparative Experiment A | Comparative Experiment B |
|---|---|---|---|
| Test 1 | 0.34/0.35 | 0.40/0.59 | 0.38/>0.90 |
| Test 2 | 0.14 | 0.31 | 0.28 |
| Test 3 | 1.5 | 1.7 | 3.3 |
| Test 4 | 1.6 | 2.4 | 3.2 |
| Test 5 | 0 | 100 | 100 |
| Test 6 | 0.20 | 1.7 | 1.4 |
| Test 7 | no blocking | blocks | blocks |
| Test 8 | 2 | 4 | 4 |
| Test 9 | 500 | 60 | 20 |

EXAMPLE 2

900 g of γ-iron oxide having a coercive force of 28 kA/m and a specific surface area of 20 m²/g, 72 g of the additive described under polymer B, 400 g of tetrahydrofuran, 400 g of dioxane and 300 g of a 20% strength tetrahydrofuran/dioxane solution of an 80:10:10 copolymer of vinyl chloride, dimethyl maleate and diethyl maleate, having a K value of 60, in the abovementioned solvent mixture were introduced into a steel ball mill having a capacity of 6 liters and containing 8,000 g of steel balls 4-6 mm in diameter, and dispersion was carried out for 30 hours. Thereafter, 91 g of the abovementioned solution of vinyl chloride/dimethyl maleate/diethyl maleate copolymer, 852 g of a 13% strength solution of a polyester-polyurethane, having a K value of 60 and prepared from a polyester obtained from butanediol and adipic acid (0.42 mole), butanediol (0.55 mole), trimethylolpropane (0.03 mole) and diphenylmethane diisocyanate (1.05 moles), in a mixture of equal parts of tetrahydrofuran and dioxane, 0.9 g of silicone oil, 0.9 g of hydroquinone, 1.8 g of n-butyl stearate and 9.0 g of isostearic acid were added, and dispersion was continued for a further 2 hours.

The resulting dispersion was passed under pressure through a filter having 5 μm pores, and was then applied to a 12 μm thick polyethylene terephthalate film using a conventional knife coater. The coated film was passed through a magnetic field to orient the magnetic particles and then dried at from 50° to 90° C. The dry magnetic layer was smoothened and compressed by passing the coated film between rollers heated at 70° C., under a nip pressure of 200 kp/cm, so that the thickness of the magnetic layer was 4.5 μm. The film was then slit into 3.81 mm wide audio tapes. The magnetic properties were measured in a field of 100 kA/m. The electroacoustic properties were measured in accordance with DIN No. 45,401, DIN No. 45,403 and DIN No. 45,512 (Sheet 12) against reference tape IEC 1, and were found to conform to this standard. The mechanical properties are shown in Table 2.

COMPARATIVE EXPERIMENT C

The procedure described in Example 2 was followed, except that, instead of polymer B, a commercial polymer based on a salt of long-chain polyaminoamides and high molecular weight esters, as a 25% strength solution in a mixture of toluene and tetrahydrofuran, was employed. The electroacoustic properties are the same as those of Example 2, and the mechanical properties are shown in Table 2.

COMPARATIVE EXPERIMENT D

The procedure described in Example 2 was followed, except that, instead of polymer B, 63 g of a mixture of an oxyethylated phosphate and an alkylamide of sulfosuccinic acid, as a 50% strength solution in toluene, were employed. The electroacustic properties are the same as those of Example 2, and the mechanical properties are shown in Table 2.

EXAMPLE 3

The procedure described in Example 2 was followed, except that the amount of polymer B added was doubled. The mechanical properties are shown in Table 2.

COMPARATIVE EXPERIMENT E

This experiment corresponds to Comparative Experiment C, except that twice the amount of the additives stated in that experiment was employed. The results are shown in Table 2.

TABLE 2

|  | Examples | | Comparative Experiments | | | |
|---|---|---|---|---|---|---|
|  | 2 | 3 | C | D | E | F |
| Test 9 | >100 | >100 | 20 | 20 | 8 | 5 |
| Test 3 | 1–2 | 1–2 | 3–4 | 4 | 4 | 4 |
| Microhardness according to Knoop | 9.5 | 9.8 | 8.5 | 8.2 | 7.8 | 6.9 |
| Test 4 | 1.7 | 1.6 | 2.8 | 3.2 | 3.2 | 3.6 |

EXAMPLE 4

900 g of a $\gamma$-$Fe_2O_3$ having a coercive force of 26.0 kA/m and a specific surface area of 18.6 m$^2$/g, 72 g of polymer B, 800 g of a solvent mixture comprising equal parts of tetrahydrofuran and dioxane, 276.9 g of a 13% strength solution of a polyester-polyurethane, having a K value of 60 and prepared from a polyester based on butanediol and adipic acid (0.42 mole), butanediol (0.55 mole), trimethylolpropane (0.03 mole) and diphenylmethane diisocyanate (1.05 mole), in the abovementioned solvent mixture, and 120.1 g of a 20% strength solution of an 80:10:10 copolymer of vinyl chloride, dimethyl maleate and diethyl maleate, having a K value of 60, in the abovementioned solvent mixture were introduced into a steel ball mill having a capacity of 6 liters and containing 8 kg of steel balls 4–6 mm in diameter, and dispersion was carried out for 30 hours. then, in a second operation, 646 g of polyurethane solution, 280 g of copolymer solution, 0.9 g of silicone oil, 0.9 g of hydroquinone, 1.8 g of n-butyl stearate and 9 g of isostearic acid were added. Dispersion was continued for a further 2 hours, after which the dispersion was removed from the mill and passed under pressure through a filter having 5 $\mu$m pores. After filtration, the dispersion, without the addition of a polyisocyanate, was applied to a 12 $\mu$m thick polyethylene terephthalate film using a conventional knife coater. The coated film was passed through a magnetic field to orient the magnetic particles and then dried at from 50° to 90° C. The dry magnetic layer was smoothened and compressed by passing the coated film between rollers heated at 70° C., under a nip pressure of 200 kp/cm, so that the thickness of the magnetic layer was 4.5 $\mu$m. The film was then slit into 3.81 mm wide audio tapes. The electroacoustic properties conformed to the IEC I standard. The mechanical properties are given in Table 3.

EXAMPLE 5

The procedure described in Example 4 was followed, except that, in the second addition operation, only 578 g of polyurethane solution and 250 g of copolymer solution were used and, after filtration, 6.7 g of a 75% strength solution of a triisiocyanate, obtained from 3 moles of toluylene diisocyanate and 1 mole of trimethylolpropane, in ethyl acetate were added per kg of dispersion, while stirring vigorously. Further processing was carried out as described in Example 4. The results are shown in Table 3.

EXAMPLE 6

The procedure described in Example 5 was followed, except that, in the second addition operation, 510 g of polyurethane solution and 221 g of copolymer solution were added, and crosslinking was carried out using 13.8 g of polyisocyanate per kg of dispersion. The results are shown in Table 3.

COMPARATIVE EXPERIMENT G

The procedure described in Example 6 was followed, except that the polymer described in Comparative Experiment C was used instead of polymer B. The results are shown in Table 3.

TABLE 3

|  | Example | | | Comparative Experiment G |
|---|---|---|---|---|
|  | 4 | 5 | 6 |  |
| Amount of triisocyanate added, in g/kg of dispersion | — | 6.7 | 13.8 | 13.8 |
| Degree of crosslinking, based on the active H atoms in the polyurethanes | — | 30% | 60% | 60% |
| Test 9 | >100 | >100 | >100 | Drop in output level after 80 passes |
| Test 3 | 1.6 | 1.3 | 1.3 | 2.8 |
| Microhardness according to Knoop | 8.6 | 9.7 | 11.2 | 9.2 |

EXAMPLE 7

102 kg of tetrahydrofuran, 36 kg of a 50% strength solution of the polyurea-urethanes according to Example B of German Laid-Open Application DOS No. 3,227,164, 100 kg of a ferromagnetic chromium dioxide having a mean needle length of 0.5 $\mu$m, 2.5 kg of zinc oleate, 0.25 kg of a commerical silicone oil, 4 kg of polymer C and 1 kg of n-butyl stearate were introduced into a steel ball mill having a capacity of 600 parts by volume and containing 600 kg of steel balls 4–6 mm in diameter, and dispersion was carried out for 36 hours. The dispersion was then filtered under pressure, 0.035 part, per part of dispersion, of a 75% strength solution of a triisocyanate based on 3 moles of toluylene diisocyanate and 1 mole of trimethylolpropane were added to the stirred dispersion, and directly thereafter the dispersion was applied to a 15 $\mu$m thick polyethylene terephthalate film. The coated film was passed through a magnetic field to orient the magnetic particles, dried at from 50° to 80° C. and calendered between rollers heated at 60° C., using a nip pressure of 200 kg/cm.

The magnetic properties were measured in a field of 160 kA/m: the remanence was 174 mT, and the orientation ratio of the magnetic particles, i.e. the ratio of the residual induction in the playing direction to that in the crosswise direction, was 3.1. The film was slit into 3.81 mm wide tapes, and the electroacoustic properties were then measured in accordance with DIN Nos. 45,401, 45,403 and 45,512 (Sheet 12), against reference tape IEC II. The electroacoustic properties were distinctly superior to those laid down in the IEC standard. The mechanical properties are shown in Table 4.

COMPARATIVE EXPERIMENT H

The procedure described in Example 6 was followed, except that the addition of polymer C was omitted. The magnetic and electroacoustic properties are the same as those in Example 6. The mechanical properties are shown in Table 4.

COMPARATIVE EXPERIMENT I

The procedure described in Example 6 was followed, except that the addition of zinc oleate was omitted. The magnetic layer contained a large amount of agglomerates (very rough, with a large number of casting defects), so that it was impossible to carry out an evaluation.

COMPARATIVE EXPERIMENT K

The procedure described in Comparative Experiment I was followed, except that 10 kg of polymer C were used. The magnetic layer was just as useless as in Comparative Experiment I.

TABLE 4

| | Example | Comparative Experiment H |
|---|---|---|
| Layer thickness [μm] | 5.3 | 5.4 |
| Test 1 | 0.20/0.30 | 0.32/0.46 |
| Test 2 | 0.18 | 0.32 |
| Test 3 | 1.6 | 2.2 |
| Test 4 | 1.5 | 2.3 |
| Test 5 | 0 | 50 |
| Test 9 | 100 | 50 |

We claim:

1. A process for the production of a magnetic recording medium by dispersing finely divided anisotropic magnetic material and conventional additives in a solution of a polymeric binder in an organic solvent, or in an aqueous dispersion of a polymeric binder, applying a layer of the dispersion to a non-magnetizable base, orienting the anisotropic magnetic material by means of a magnetic field and drying the applied layer, wherein a polymer comprising (A) from 25 to 80% by weight of a polyether acrylate of the formula

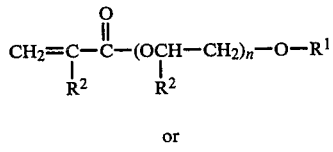

or

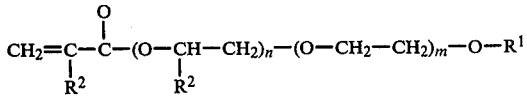

or a mixture of (I) and (II), where $R^1$ is hydrogen, alkyl of 1 to 25 carbon atoms or $C_1$-$C_{12}$-alkyl-substituted phenyl, $R^2$ is hydrogen or $CH_3$, n is 1 to 30 and m is 0 to 25, (B) from 75 to 20% by weight of an ethylenically unsaturated $C_3$-$C_{10}$-carboxylic acid, or a mixture of such acids, and (C) from 0 to 40% by weight of an acrylate of the formula

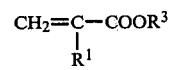

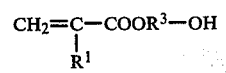

or

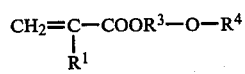

where $R^3$ is alkyl of 1 to 20 carbon atoms, $R^4$ is identical to $R^3$ or is

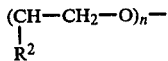

where n is 1 to 20, and
$R^1$ and $R^2$ have the above meanings, is added to the dispersion.

2. A process as claimed in claim 1, wherein component (B) is acrylic acid or methacrylic acid, or a mixture of these.

3. A process as claimed in claim 1, wherein some or all of component (C) is replaced by other ethylenically unsaturated monomers of 2 to 20 carbon atoms.

4. A process as claimed in claim 1, wherein component (B) is present in salt form.

5. A process as claimed in claim 4, wherein the counter-ion used is ammonium or an amine having a boiling point below 100° C., or a mixture of these.

6. A process as claimed in claim 1 wherein the binder used in an aqueous anionic polyurethane ionomer.

7. A process as claimed in claim 1 wherein the binder used is a hydroxyl-containing polyurethane-urea having a molecular weight of from 500 to 3,000, in combination with a polyisocyanate.

8. A process as claimed in claim 1 wherein the binder consists partly or completely of a polyurethane elastomer.

* * * * *